(12) United States Patent
Bell et al.

(10) Patent No.: US 7,520,532 B2
(45) Date of Patent: Apr. 21, 2009

(54) SEAT BELT ARRANGEMENT FOR CHILD OCCUPANTS OF A VEHICLE

(75) Inventors: John Bell, Carlisle (GB); Martyn Palliser, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 260 days.

(21) Appl. No.: 11/685,975

(22) Filed: Mar. 14, 2007

(65) Prior Publication Data

US 2008/0100122 A1 May 1, 2008

(30) Foreign Application Priority Data

Oct. 30, 2006 (EP) ................................. 06123208

(51) Int. Cl.
*B60R 22/20* (2006.01)
(52) U.S. Cl. .................... 280/808; 280/801.1; 297/473
(58) Field of Classification Search ............. 280/801.1, 280/801.2, 808; 297/486, 473, 483, 485
See application file for complete search history.

(56) References Cited

U.S. PATENT DOCUMENTS

| | | | |
|---|---|---|---|
| 4,973,083 A | | 11/1990 | Lichards et al. |
| 5,080,396 A | | 1/1992 | Vacanti |
| 5,165,719 A | * | 11/1992 | Yano ...................... 280/801.2 |
| 5,169,174 A | | 12/1992 | Gray |
| 5,178,439 A | | 1/1993 | McCraken |
| 5,366,244 A | * | 11/1994 | Lane, Jr. .................. 280/801.2 |
| 5,472,236 A | | 12/1995 | Gray |
| 5,609,367 A | * | 3/1997 | Eusebi et al. ............... 280/808 |
| 5,611,604 A | * | 3/1997 | Thomas et al. .............. 297/478 |
| 5,678,887 A | | 10/1997 | Sher |
| 5,725,248 A | * | 3/1998 | Inoue et al. ............... 280/801.2 |
| 5,733,004 A | | 3/1998 | Celestina-Krevh et al. |
| 5,794,977 A | * | 8/1998 | Frank ...................... 280/801.2 |
| 5,924,731 A | * | 7/1999 | Sayles et al. ................ 280/807 |
| 5,979,991 A | * | 11/1999 | Lewandowski et al. ...... 297/483 |
| 5,997,098 A | | 12/1999 | Coffeen |
| 6,032,982 A | * | 3/2000 | Pakulsky et al. ............ 280/805 |
| 6,106,012 A | * | 8/2000 | Boegge et al. ............ 280/801.1 |
| 6,312,014 B1 | * | 11/2001 | Ando et al. ............... 280/801.2 |
| D452,361 S | | 12/2001 | Patrizi et al. |

(Continued)

FOREIGN PATENT DOCUMENTS

DE          2906988 A1      8/1979

(Continued)

*Primary Examiner*—Toan To
(74) *Attorney, Agent, or Firm*—Lonnie Drayer

(57) ABSTRACT

A vehicle seat arrangement provides location and fixing points on the vehicle seat that will take crash loads and can be used to position a webbing path adapter to serve as a guide for placing a standard seat belt in a suitable position for when a child is occupying the seat. A vehicle seat arrangement includes a seat backrest having an upholstered part overlying a load-bearing plate. A first plurality of holes pass through the upholstered part and a second, aligned, plurality of holes pass through the load-bearing plate. A webbing path adapter has a passageway for receiving seat belt webbing. A pin connects the webbing path adapter in a removable manner to any one of a plurality of holes on the load-bearing plate through the corresponding holes in the upholstered part of the seat backrest.

20 Claims, 5 Drawing Sheets

U.S. PATENT DOCUMENTS

| | | | |
|---|---|---|---|
| 6,669,302 B2 * | 12/2003 | Warner et al. | 297/483 |
| 6,733,041 B2 * | 5/2004 | Arnold et al. | 280/801.2 |
| 6,846,020 B2 | 1/2005 | Xu | |
| 6,857,700 B2 * | 2/2005 | Eastman et al. | 297/250.1 |
| 7,232,154 B2 * | 6/2007 | Desmarais et al. | 280/801.2 |
| 2002/0167213 A1 | 11/2002 | Warner, Jr. et al. | |
| 2004/0061323 A1 | 4/2004 | Xu | |
| 2004/0113412 A1 * | 6/2004 | Go | 280/808 |

FOREIGN PATENT DOCUMENTS

| | | | |
|---|---|---|---|
| DE | 4343867 | C1 | 3/1995 |
| DE | 102005033367 | B3 | 10/2006 |
| EP | 0251242 | A2 | 1/1988 |
| EP | 0501623 | A1 | 9/1992 |
| EP | 1514748 | A1 | 10/2006 |
| GB | 2015321 | A | 9/1979 |
| KR | 10-1997-0026560 | A | 6/1997 |
| KR | 20-1999-0020387 | U | 6/1999 |
| WO | 2006/129112 | A | 12/2006 |

\* cited by examiner

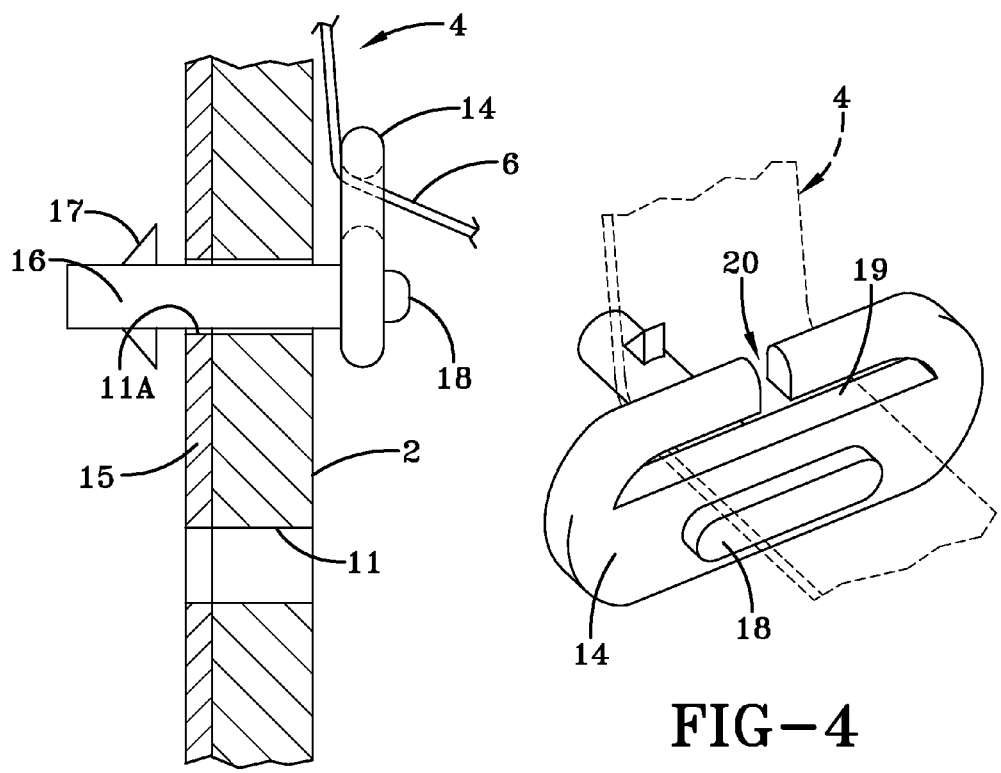
FIG-3
FIG-4
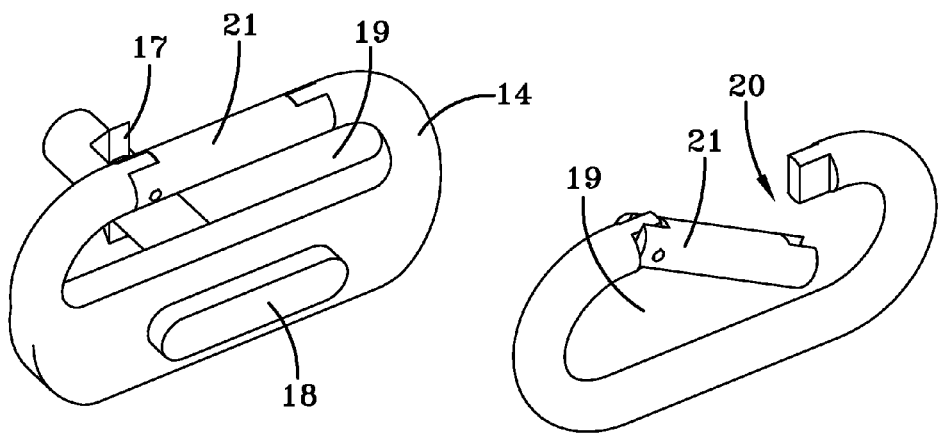
FIG-5
FIG-6

SEAT BELT ARRANGEMENT FOR CHILD OCCUPANTS OF A VEHICLE

FIELD OF THE INVENTION

The present invention relates to a vehicle occupant safety restraint, particularly a seat belt that is suitable for restraining a child occupying a vehicle, but which can also be used for restraining an adult occupying a vehicle.

BACKGROUND OF THE INVENTION

A conventional seat belt comprises a length of seat belt webbing connected at three points to load-bearing parts of a vehicle. The seat belt webbing is designed to have a lap portion that passes laterally across the hips of a seat occupant, and a torso portion that passes diagonally across the torso of the seat occupant from one hip to the opposite shoulder.

Typically one end of the seat belt webbing is attached to a sill anchor that is bolted to a load-bearing longitudinally extending structural member of a vehicle on one side of a seat, usually between the seat and an adjacent door. The lap and torso portions of the seat belt join at a buckle mechanism on the opposite side of the seat. The torso portion of the seat belt webbing is attached to a seat belt retractor mounted to a load-bearing part of the vehicle, for example a side pillar or sill, or directly to a structural member of a seat.

The seat belt retractor increases comfort for the seat occupant restrained by the belt since it allows the seat belt webbing to pay out under relatively low loads to enable limited movement of the restrained seat occupant, for example to reach in-car entertainment controls or storage compartments. However the seat belt retractor is biased to keep the seat belt webbing relatively taut about the seat occupant and a locking element locks the seat belt retractor against the payout of seat belt webbing in the event an acceleration sensor detects a rapid acceleration or deceleration indicative of a crash.

The seat belt webbing is fastened to the buckle mechanism by a buckle tongue that is attached to the seat belt webbing. The buckle tongue can slide on the seat belt webbing so that the proportions of the seat belt webbing making up the lap and torso portions can easily be varied to reflect the size of the seat occupant.

Known seat belt restraints of this sort tend to be unsuitable for vehicle occupants of shorter than average stature, particularly for children, because the upper fastening point of the torso portion of the seat belt is fixed to accommodate an average person and is fixed at or above the height of the back of the seat. This is particularly so in a seat belt installation for a rear seat.

Thus the torso portion of the seat belt webbing tends to be badly positioned for a child or short person and usually passes too close or adjacent to the neck of the child or short person. Because the child or short person does not fit into the adult seat belt properly a shoulder of the child or short person can roll out of the seat belt during a crash effectively making the seat belt a two-point lap belt only. In addition the child may slide under the lap portion; this is known as submarining. It is well known that children feel uncomfortable with adult seat belt restraints and often position the torso portion behind their back to reduce discomfort.

DISCUSSION OF THE PRIOR ART

A solution to the above-discussed problem is exemplified in GB 2 015 321 A for a product known as "The Generation Belt" which provides an additional, vertically extending vertically extending strap which is fastened taut in a generally vertical line to the back of the seat. A support for the torso portion of a seat belt is attached to the vertically extending strap so that the torso portion of a seat belt can slide so that its vertical position can be varied to suit the position of the seat occupant's shoulder. The support for the torso portion of the seat belt is not retained in the desired position by anything other than friction and under high crash loads it may slide upwardly into an unsuitable and dangerous position again. This belt was designed for comfort rather than safety and does not comply with the latest safety regulations of which at least one is ECE 44/03.

US 2004/0061323 A1 discloses a three-point seat belt restraint system for both adults and children that has a plurality of buckle members distributed on the seat back. A buckle tongue attached to the torso portion of the seat belt webbing selectively engages the buckle mechanism. In this way the angle at which the torso portion of the seat belt webbing extends across the body of a user can be adjusted. This system requires costly, large and unsightly means to locate the torso portion of the seat belt webbing in each position. This not only detrimentally affects the aesthetics of the seat, but the protruding features are likely to cause discomfort to a larger seat occupant. The known method also requires significant structural changes to the seat and seat upholstery to accommodate the mechanism.

SUMMARY OF THE INVENTION

According to the present invention there is provided a vehicle seat arrangement comprising: a seat backrest having an upholstered part overlying a load-bearing plate; a first plurality of holes passing through the upholstered part and a second, aligned, plurality of holes passing through the load-bearing plate a webbing path adapter having a passageway for receiving seat belt webbing; and means for connecting the webbing path adapter in a removable manner to any one of a plurality of positions on the load-bearing plate through the upholstered part of the seat backrest.

According to a second embodiment the seat backrest further comprises a movable lock plate having a third plurality of holes, wherein the lock plate is movable into a position in which the third plurality of holes is aligned with the first and second plurality of holes, so that the pin of the webbing path adapter can be inserted through corresponding aligned holes in the upholstered portion, the lock plate and the load-bearing plate, and wherein the lock plate is biased toward a position in which the third plurality of holes is not aligned with the first and second plurality of holes so that the lock plate engages the pin to lock the adapter to the backrest.

BRIEF DESCRIPTION OF THE DRAWINGS

FIG. 3 is a schematic cross sectional side view of a part of the seat belt arrangement of FIGS. 1 and 2.

FIG. 4 is a perspective view of a component of the seat belt arrangement shown in FIG. 3 in more detail.

FIG. 5 is a perspective view of an alternative embodiment of the component shown in FIGS. 3 and 4.

FIG. 6 is a perspective view of the component shown in FIG. 5.

DETAILED DESCRIPTION OF THE INVENTION

Figure 1:
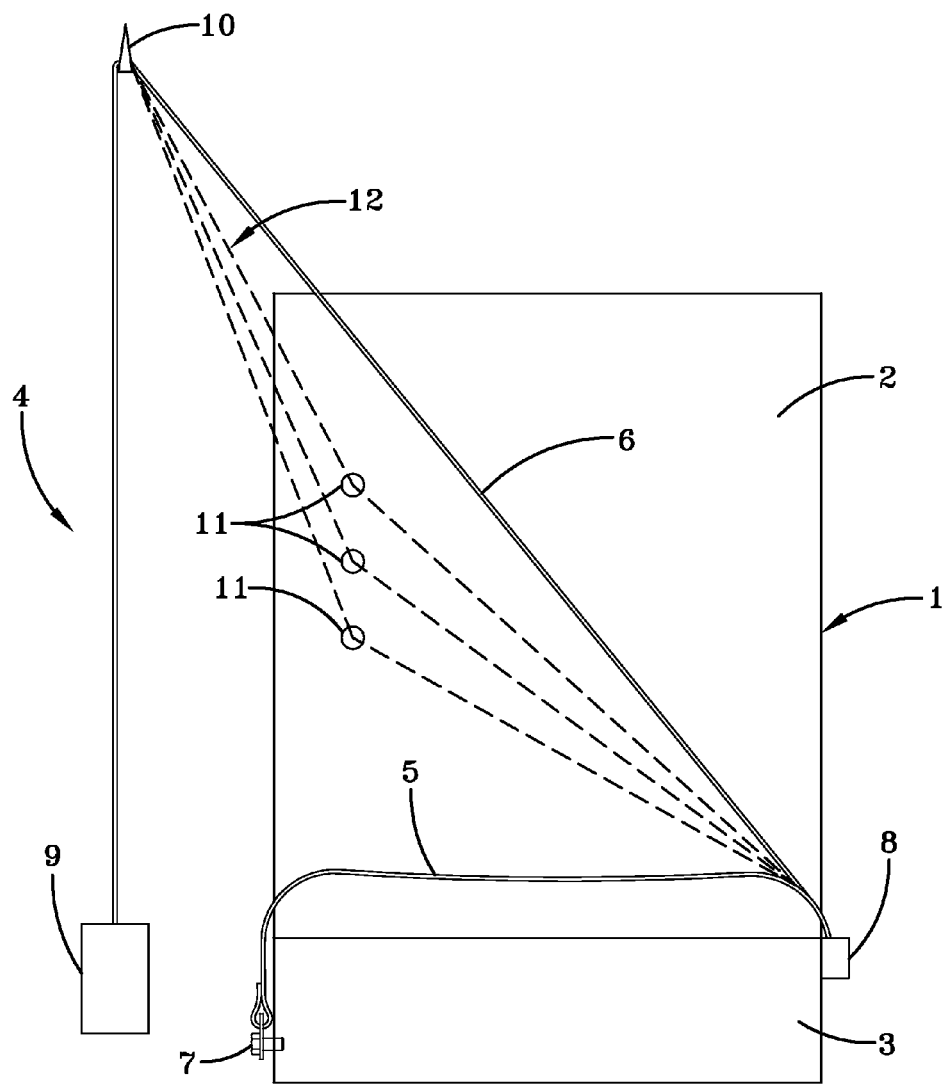
FIG. 1 is a schematic front view of a seat belt arrangement according to the present invention.

FIG. 1 shows an upholstered vehicle seat 1 with a backrest 2 and seat base 3. A seat belt 4 comprises a lap portion 5 for passing across the hips of a seat occupant (not shown) from one side of the seat to the opposite side, and a torso portion 6 for passing diagonally across the seat from the seat occupant's hip to his opposite shoulder. The seat belt is anchored to load-bearing parts of the vehicle at three points 7, 8, 9. One load-bearing attachment 7 usually comprises a bolt fixed to a load-bearing part of the vehicle. Another load-bearing attachment 8 comprises a buckle mechanism wherein the buckle mechanism is anchored to a load-bearing part of the vehicle and the seat belt webbing 5, 6 passes through an opening in a buckle tongue which is engageable with the buckle mechanism. The third load-bearing attachment 9 comprises a seat belt retractor bolted to a load-bearing part of the vehicle such as a pillar and which serves to allow the seat occupant more comfort by allowing payout of the seat belt webbing under low loads while comprising a locking mechanism which engages under high loads indicative of a crash to lock the seat belt retractor against further payout. The seat belt webbing is supported above the shoulder of a seat occupant by a webbing guide 10 at an upper fixing point comprising a load-bearing part of the vehicle such as a side pillar. The webbing guide 10 may comprise either a turning loop or a conventional height adjuster. Alternatively the seat belt retractor 9 can be fixed directly to a seat structure, for example directly on a seat back 2 or to a parcel shelf or load-bearing bar behind the seat back 2.

Three holes 11 in the form of eyelets are located in the seat backrest 2, generally in a range of positions which are likely to fall in the region of a shoulder of a child between three and fourteen years of age. The lowest hole should be at the average minimum shoulder height for a child of three years of age and weighing approximately 18 kilograms. The highest hole should be at approximately the average shoulder height for a fourteen-year-old child. These holes are used to attach a webbing path adapter which serves as a supplementary support for the torso portion 6 of the seat belt webbing to adapt the path of the seat belt webbing and divert the torso portion 6 of the seat belt 4 along the paths indicated by the broken lines 12. These positions for the torso portion 6 of the seat belt are more suitable for a child because they are safer and more comfortable. Of course any number of holes 11 may be provided. Preferably the holes 11 are no larger than necessary so as to avoid significantly changing the appearance of the seat and since the webbing path adapter is removable there is nothing protruding from the backrest to spoil the comfort of an adult using the same seat.

Figure 2:
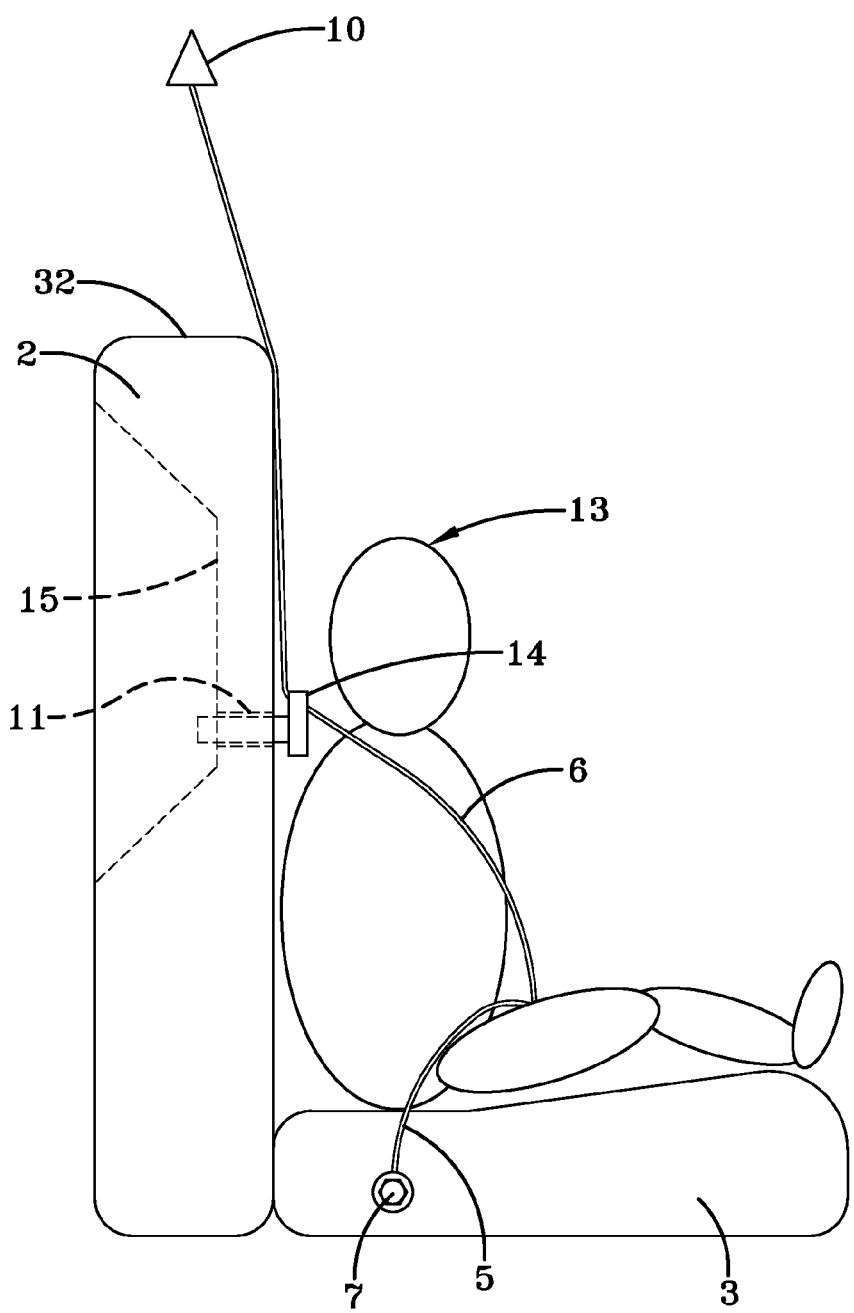
FIG. 2 is a schematic side view of the seat belt arrangement of FIG. 1.

In FIG. 2 a side view of the seat belt arrangement of FIG. 1 is shown in use with a child 13 sitting on the seat base 3 against the upholstered part 32 of the seat backrest 2. The seat belt again comprises a lap portion 5 and a torso portion 6 but here the torso portion 6 is diverted via a webbing path adapter 14 that is inserted in the lowest hole 11 in the backrest 2. In order to provide sufficient strength in the backrest 2 to ensure that the webbing path adapter 14 is secured in a load-bearing fashion, a metal plate 15 is made part of the seat structure as shown. Alternatively, a metal plate could be bolted or otherwise secured to the outside at the rear of the backrest. It can be seen that the child 13 is more safely and comfortably secured because the torso portion 6 of the seat belt passes over or close to his shoulder.

In FIG. 3 the webbing path adapter 14 is shown in more detail. In this view the webbing path adapter 14 passes through the upper of two holes 11 in the backrest 2, and through a corresponding aligned hole in the metal plate 15 that is incorporated into the seat back 2. The webbing path adapter 14 has a pin 16 at one end of which are retractable projections 17 that lock the webbing path adapter in the hole 11. At the other end of the pin, facing the seat occupant, is a button 18 for retraction of the projections 17 and a passageway through which the seat belt webbing 4 passes as it transitions from the torso portion 6 of the webbing to.

FIG. 4 is a perspective view of this webbing path adapter 14. The passageway 19 through which the seat belt webbing 4 passes is shown with a centrally located gap 20 in its circumference so that the seat belt webbing 4 can be easily inserted into the passageway 19 through the gap 20.

FIG. 5 shows an alternative embodiment of a webbing path adapter 14 with a spring-loaded clip 21 closing the gap 20. This feature is shown in more detail in FIG. 6. The spring-loaded clip 21 makes the webbing path adapter 14 act like a carabiner used in rock climbing to channel ropes. The clip is deflectable inwardly when seat belt webbing is being inserted into the passageway but is prevented from outward deflection and thus retains the seat belt webbing in the passageway against accidental release due to pressure from the seat belt webbing. It can be released from the passageway by manual depression of the clip.

Figure 7:
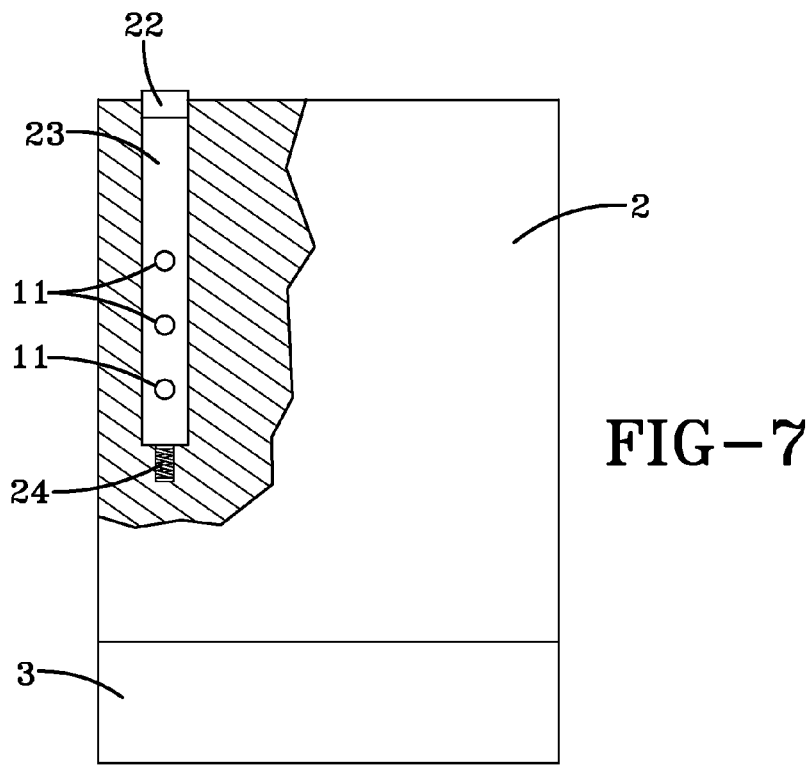
FIG. 7 is a schematic front view of another vehicle seat arrangement.
Figure 8:
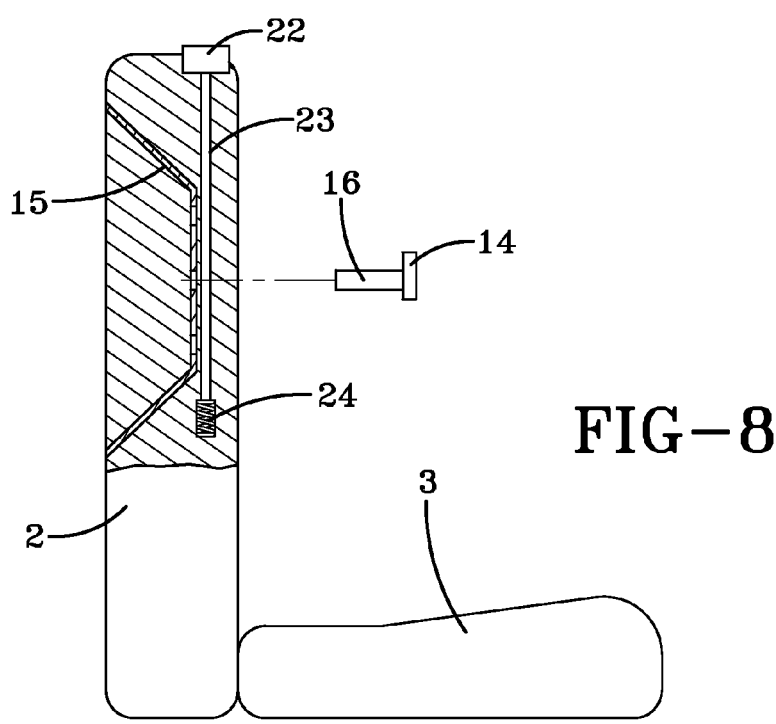
FIG. 8 is a schematic side view, partially in cross section, of the vehicle seat arrangement of FIG. 7.

In FIGS. 7 and 8 an alternative embodiment of the vehicle seat arrangement is shown. The webbing path adapter 14 is releasable from the backrest 2 by an adapter release button 22 located on the backrest 2 of the vehicle seat. The upholstery on the front of the backrest 2 is not shown in FIG. 7 so as to more clearly illustrate the features of the invention. A lock plate 23, having two or more holes 11 therethrough, is positioned on the backrest 2, generally parallel to the metal plate 15. The lock plate 23 is movable in a generally vertical direction and can be moved towards the seat base 3 by means of the adapter release button 22 connected to a first end of the lock plate 23. This movement is resisted by a spring 24 connected to a second opposite end of the lock plate 23. In this example the holes 11 are circular in shape, although in practice they can be any shape that is adapted to engage with the pin 16 of the webbing path adapter 14 to lock the guide 14 in position. The pin 16 may have a feature such as an indented section or hole to engage more positively with the holes 11.

Figure 9:
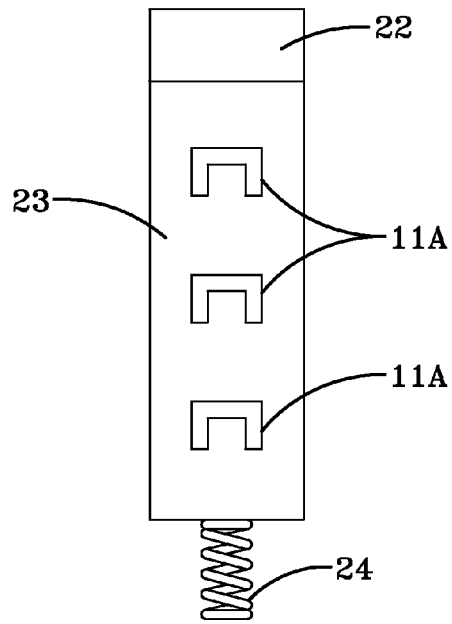
FIG. 9 is an enlarged front view of an alternative embodiment of a lock plate for the vehicle seat arrangement of FIGS. 7 and 8.

FIG. 9 shows another lock plate 23 in which the holes 11 are shaped as inverted U's so as to engage a pin (not shown) with a hole though it.

Figure 10A:
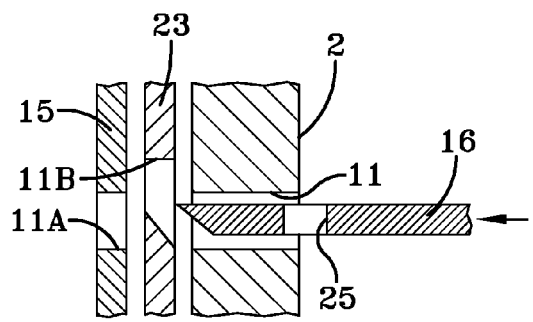
FIGS. 10*a*-10*d* illustrate a locking and releasing mechanism for use with the lock plate of FIGS. 7, 8 and 9.
Figure 10C:
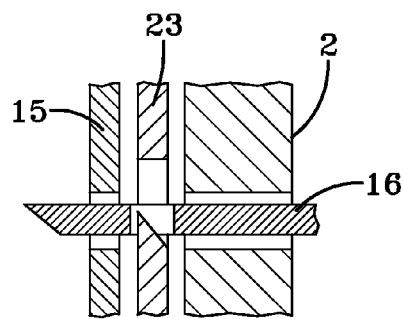
Figure 10B:
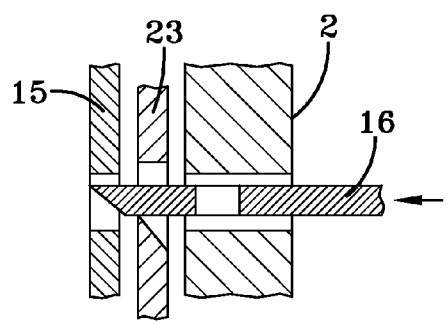

FIGS. 10*a* to 10*d* show in sequence how the movable lock plate 23 can engage the pin 16 of the webbing path adapter 14 and, in combination with the metal plate 15, how the pin 16 is locked in position. The arrows illustrate the direction of travel for each component. FIG. 10*a* shows the pin 16 of the webbing path adapter 14 being pushed into a hole 11 in the upholstered part of the backrest 2. The pin 16 has a hole or indentation 25. FIG. 10*b* shows how the pin 16 pushes against the lock plate 23 thereby forcing it to move downwardly in a generally vertical direction to allow the pin 16 to pass through a hole 11B in the lock plate 23. The forward end of the pin 16 and the lower side of the hole 11B in the lock plate 23 are preferably tapered to resist joining.

As shown in FIG. 10c, once the pin 16 has been pushed far enough into the hole 11B so that the indentation 25 reaches the lock plate 23, then the spring (not shown) forces the lock plate 23 to move back substantially to its normal position, thereby locking the pin 16 in place. A metal plate 15, with a hole 11A therethrough, is included to strengthen the locking mechanism.

Figure 10D:
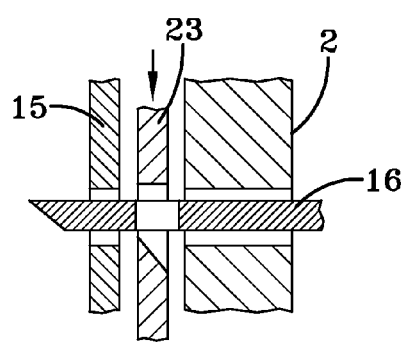

FIG. 10d shows how the pin 16 can be released by moving the lock plate 23 downwardly to allow the pin 16 to be pulled out of the backrest 2. The lock plate is moved downwardly, against the bias of a spring, by an adapter release button 22 shown in FIG. 9 on top of the lock plate 23.

The invention provides location and fixing points on a vehicle seat which will take crash loads and which can be used to position a webbing path adapter to serve as a guide for placing a standard seat belt in a suitable position for when a child is using the seat.

The position of the webbing path adapter can be altered to suit the size of the child and can be removed altogether if an adult uses the seat belt. The webbing path adapter can be made small enough to be easily storable in a vehicle, for example in a glove compartment. This invention can be used with or without a child seat or booster seat and the position of the webbing path adapter can easily be adapted to suit different child/booster seats as required. However it has the advantage of allowing a normal vehicle seat to be used interchangeably for either a child or an adult without the need to carry a bulky child seat or booster seat.

The invention can provide a vehicle safety restraint that is simple, cost effective and flexible. It is safer and more comfortable for children of a variety of sizes, and can easily be adapted for adults or removed so that a seat can be used normally with no detriment to comfort or safety for an adult, and which has a minimal visual impact on the look of the seat.

It is understood that the invention is not limited to the particular construction and arrangement of parts herein illustrated and described, but embraces all such modified forms thereof as come within the scope of the following claims.

The invention claimed is:

1. A vehicle seat arrangement comprising:
a seat backrest having an upholstered part overlying a load-bearing plate;
the upholstered part having a first plurality of holes passing therethrough and the load-bearing plate having a second plurality of holes passing therethrough, the holes of the first plurality of holes being aligned with the holes of the second plurality of holes; and
a webbing path adapter having a passageway for receiving a seat belt webbing, the webbing path adapter including a means for connecting the webbing path adapter to any one of a plurality of holes on the load-bearing plate through the aligned hole in the upholstered part of the seat backrest.

2. The vehicle seat arrangement according to claim 1 wherein the means for connecting comprises a pin sized such that it can be inserted through any of the holes in the upholstered part and the load-bearing plate.

3. The vehicle seat arrangement according to claim 1 further comprising at least one retractable projection located on the webbing path adapter that cooperates with an aligned pair of the holes to retain the webbing path adapter.

4. The vehicle seat arrangement according to claim 2 further comprising at least one retractable projection located on the pin arranged to cooperate with an aligned pair of the holes to retain the webbing path adapter.

5. The vehicle seat arrangement according to claim 3 wherein the projection is retractable by means of a spring loaded push button located on the webbing path adapter.

6. The vehicle seat arrangement according to claim 4 wherein the projection is retractable by means of a spring loaded push button.

7. The vehicle seat arrangement according to claim 2 wherein the seat backrest further comprises a movable lock plate disposed between the plurality of holes in the upholstered part and the load bearing plate, the movable lock plate having a third plurality of holes passing therethrough, the lock plate being movable into a position in which the holes of the third plurality of holes are aligned with the holes of the first and second plurality of holes, so that the pin of the webbing path adapter can be inserted through corresponding aligned holes in the upholstered portion, the lock plate and the load-bearing plate, and wherein the lock plate is biased toward a position in which the third plurality of holes is not aligned with the first and second plurality of holes so that the lock plate engages the pin to lock the webbing path adapter to the backrest.

8. The vehicle seat arrangement according to claim 7 wherein the lock plate is normally held in a non-aligned position by a spring and is movable to an aligned position by means of a release button.

9. The vehicle seat arrangement according to claim 1 wherein the passageway of the webbing path adapter has a gap in its circumference through which seat belt webbing can be inserted.

10. The vehicle seat arrangement according to claim 9 wherein the webbing path adapter comprises a spring loaded lever that closes the gap.

11. The vehicle seat arrangement according to claim 10 wherein the spring-loaded lever is pivotally movable inwardly of the passageway and is prevented from movement outwards by abutment with the passageway.

12. A vehicle seat arrangement comprising:
a seat backrest having an upholstered part overlying a load-bearing plate;
the upholstered part having a first plurality of holes passing therethrough and the load-bearing plate having a second plurality of holes passing therethrough, the holes of the first plurality of holes being aligned with the holes of the second plurality of holes; and
a webbing path adapter having a passageway for receiving a seat belt webbing, the webbing path adapter having a pin for connecting the webbing path adapter to any one of a plurality of holes on the load-bearing plate through the corresponding holes in the upholstered part of the seat backrest, at least one retractable projection located on the pin arranged to cooperate with any one of the aligned pairs of the plurality of holes to retain the webbing path adapter, and the projection is retractable by means of a spring loaded push button.

13. The vehicle seat arrangement according to claim 12 wherein the passageway of the webbing path adapter has a gap in its circumference through which seat belt webbing can be inserted.

14. The vehicle seat arrangement according to claim 13 wherein the webbing path adapter comprises a spring loaded lever that closes the gap.

15. The vehicle seat arrangement according to claim 14 wherein the spring-loaded lever is pivotally movable inwardly of the passageway and is prevented from movement outwards by abutment with the passageway.

16. A vehicle seat arrangement comprising:
a seat backrest having an upholstered part overlying a load-bearing plate;
the upholstered part having a first plurality of holes passing therethrough and the load-bearing plate having a second plurality of holes passing therethrough, the holes of the first plurality of holes being aligned with the holes of the second plurality of holes;
a movable lock plate disposed between the plurality of holes in the upholstered part and the load bearing plate, the movable lock plate having a third plurality of holes passing therethrough, the lock plate being movable into a position in which the holes of the third plurality of holes are aligned with the holes of the first and second plurality of holes,
a webbing path adapter having a passageway for receiving a seat belt webbing, the webbing path adapter having a pin for connecting the webbing path adapter to any one of a plurality of holes on the load-bearing plate through the aligned holes in the movable lock plate and the upholstered part of the seat backrest, and wherein the lock plate is biased toward a position in which the third plurality of holes is not aligned with the first and second plurality of holes so that the lock plate engages the pin to lock the webbing path adapter to the backrest.

17. The vehicle seat arrangement according to claim 16 wherein the lock plate is normally held in a non-aligned position by a spring and is movable to an aligned position by means of a release button.

18. The vehicle seat arrangement according to claim 16 wherein the passageway of the webbing path adapter has a gap in its circumference through which seat belt webbing can be inserted.

19. The vehicle seat arrangement according to claim 18 wherein the webbing path adapter comprises a spring loaded lever that closes the gap.

20. The vehicle seat arrangement according to claim 19 wherein the spring-loaded lever is pivotally movable inwardly of the passageway and is prevented from movement outwards by abutment with the passageway.

* * * * *